United States Patent
Viala et al.

(10) Patent No.: US 9,805,299 B2
(45) Date of Patent: Oct. 31, 2017

(54) RADIO-FREQUENCY IDENTIFICATION TAG

(71) Applicant: Commissariat A L'Energie Atomique et aux Energies Alternatives, Paris (FR)

(72) Inventors: Bernard Viala, Sassenage (FR); Juvenal Alarcon Ramos, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/183,082

(22) Filed: Jun. 15, 2016

(65) Prior Publication Data
US 2016/0364642 A1    Dec. 15, 2016

(30) Foreign Application Priority Data

Jun. 15, 2015   (FR) ...................................... 15 55450

(51) Int. Cl.
*G06K 19/06*      (2006.01)
*G06K 19/077*     (2006.01)
(Continued)

(52) U.S. Cl.
CPC ....... *G06K 19/07786* (2013.01); *G01K 1/024* (2013.01); *G01K 5/483* (2013.01);
(Continued)

(58) Field of Classification Search
CPC .............. G01K 5/483; G06K 19/0717; G06K 19/0773; G06K 19/07749; G06K 19/07786; G06K 7/10346; H01Q 1/38
See application file for complete search history.

(56) References Cited

U.S. PATENT DOCUMENTS 7,986,218 B2 *   7/2011   Watters ................... G01D 5/48
                                                    324/693
2004/0061655 A1   4/2004   Forster et al.

FOREIGN PATENT DOCUMENTS

KR          101325159         6/2013
WO     WO 2004/015624 A2     2/2004
WO     WO 2012/131143 A1    10/2012

OTHER PUBLICATIONS

French Preliminary Search Report issued Apr. 4, 2016 in French Application 15 55450, filed on Jun. 15, 2015 (with English Translation of Categories of Cited Documents and Written Opinion).

(Continued)

*Primary Examiner* — Thien M Le
*Assistant Examiner* — Asifa Habib
(74) *Attorney, Agent, or Firm* — Oblon, McClelland, Maier & Neustadt, L.L.P.

(57) ABSTRACT

A radio-frequency identification tag that includes a ground plane made of an electrically conductive material, and an actuator made of a transducer material adapted to convert a variation of a physical quantity into a mechanical displacement of the ground plane between first and second positions when the physical quantity crosses a predetermined threshold in order to indicate this event to the reader. The transducer material is a thermal shape-memory material or a magnetostrictive material or a magnetic shape-memory material. The transducer material is also an electrically conductive material. The ground plane and the actuator are both formed by a single strip made of the transducer material and a mobile portion of which moves relative to an antenna between the first and second positions when the physical variable crosses the predetermined threshold.

9 Claims, 2 Drawing Sheets

(51) Int. Cl.
*G06K 7/10* (2006.01)
*G01K 5/48* (2006.01)
*G06K 19/07* (2006.01)
*H01Q 1/38* (2006.01)
*H01Q 1/22* (2006.01)
*H01Q 1/48* (2006.01)
*G01K 1/02* (2006.01)

(52) U.S. Cl.
CPC ..... *G06K 7/10346* (2013.01); *G06K 19/0717* (2013.01); *G06K 19/0773* (2013.01); *G06K 19/07749* (2013.01); *H01Q 1/2225* (2013.01); *H01Q 1/38* (2013.01); *H01Q 1/48* (2013.01)

(56) References Cited

OTHER PUBLICATIONS

R. Bhattacharyya et al. "RFID Tag Antenna Based Temperature Sensing in the Frequency Domain", 2011 IEEE International Conference on RFID, 2011, 8 pages.

\* cited by examiner

RADIO-FREQUENCY IDENTIFICATION TAG

The invention relates to a radio-frequency identification tag adapted to indicate to a reader, via a wireless connection, that a physical quantity has crossed a predetermined threshold, this physical quantity being selected from the group comprised of the temperature of the radio-frequency identification tag and of the magnetic field in which the radio-frequency identification tag is immersed. The invention also relates to an assembly comprising this radio-frequency identification tag and a reader.

The radio-frequency identification tags are also known by the term "RFID Tag" in English.

Known radio-frequency identification tags comprise:
an electrically insulating substrate,
an antenna for establishing the wireless connection with the reader, this antenna being placed entirely on and secured to the insulating substrate without any degree of freedom,
a floating ground plane made of an electrically conductive material and electrically insulated from the antenna, this ground plane being mobile relative to the antenna between a first position wherein the impedance of the antenna is equal to a first value and a second position wherein the impedance of the antenna is equal to a second value different from the first value, and
an actuator made of a transducer material adapted to convert a variation in the physical quantity into a mechanical displacement of the ground plane between its first and second positions when this variation leads the physical quantity to cross the predetermined threshold to indicate this event to the reader, the transducer material being selected from a group consisting of a thermal shape-memory material, a magnetostrictive material and a magnetic shape-memory material.

The ground plane is typically made of metal. It is most often electrically insulated from all electric reference potential. It is generally not earthed, for example. The floating ground plane acts on the impedance of the antenna and, primarily, on its inductance. Consequently, the ground plane indirectly acts on the reflection coefficient of the antenna. For this reason, this ground plane is also commonly known as the "reflective layer" and therefore sometimes to as "réflecteur" in French. In this description, the term "reflective layer" may be used to refer to the ground plane.

For example, such a radio-frequency identification tag is disclosed in the following article: R. Bhattacharyya et al.: "*RFID Tag Antenna Based Temperature Sensing in the Frequency Domain*", RFID, 2011, IEEE Conference on RFID. Hereinafter, the article is referred to as article A1 in this description.

In article A1, the ground plane is a plate made of electrically conductive material and the actuator is made of a thermal shape-memory polymer. The plate is secured to the actuator so as to be movable by the actuator between the far and near positions. Throughout the description, unless otherwise specified, the term "shape-memory material" refers to a thermal shape-memory material, i.e. a material that deforms abruptly when its temperature crosses a threshold temperature $S_T$. This temperature threshold is also referred to as the "transition temperature" of the material. For simplicity, the hysteresis phenomena are overlooked here so that the transition temperature is considered to be the same when the shape-memory material is heated and cooled.

When the temperature is below the threshold $S_T$, the actuator maintains the plate in the position far from the antenna. In the far position, the plate is approximately 1 cm below the antenna. If the temperature of the radio-frequency identification tag exceeds the threshold $S_T$, then the actuator deforms and moves the plate to the near position. In its near position, the plate is approximately 3 mm below the antenna. The presence or absence of the plate close to the antenna changes its impedance. The reader can detect the modification of the antenna impedance. Thus, the reader can know whether or not the temperature of the radio-frequency identification tag has exceeded the threshold $S_T$. The radio-frequency identification tag of article A1 has the advantage of operating in exactly the same manner regardless of its orientation in space. In particular, the operation of the antenna of article A1 does not depend on its orientation relative to the gravitational field.

Such radio-frequency identification tags able to indicate if a temperature threshold has been exceeded have numerous applications. For example, when secured to a frozen product, they can be used to ensure that the cold chain has been respected and that the temperature of the frozen product and thus that of the radio-frequency identification tag has never exceeded the threshold $S_T$. Of course, the field of application of such radio-frequency identification tags is not limited to frozen products. They can be used on any object whose temperature must be monitored at one time or another.

In article A1, the antenna is simple to manufacture because it is placed entirely on the insulating substrate. Numerous manufacturing processes can thus be used to manufacture it in a simple manner. For example, the antenna can be manufactured by depositing a conductive layer on the substrate and then etching this conductive layer. The antenna can also be achieved by localised spraying of a conductive ink onto the substrate. However, the production of the ground plane and the actuator seriously complicates the manufacture of this radio-frequency identification tag. To manufacture the radio-frequency identification tag, a plate and an actuator must be assembled in the same housing.

The prior art is also known from:
S. Caizzone et al.: "*Multi-chip RFID Antenna Integrating Shape-Memory Alloys for Detection of Thermal Thresholds*", IEEE 2011.
the application JP2009162700 by the HITACHI® Company.

The prior art above also relates to radio-frequency identification tags able to detect when a temperature threshold $S_T$ is crossed. However, in this prior art, the antenna impedance is varied by modifying its length rather than by moving a ground plane. Because of this, the antenna cannot be placed entirely on a substrate and must include mobile portions. It can thus not be produced by manufacturing processes as simple as those used to produce the antenna in article A1.

Finally, the prior art is also known from:
WO2004015624A2,
KR101325159B1,
WO2012131143A1.

The invention therefore aims to provide a radio-frequency identification tag that retains the advantages of the radio-frequency identification tag of article A1 while being even easier to manufacture. It therefore relates to a radio-frequency identification tag according to claim 1.

The radio-frequency identification tag retains the simplicity of manufacture of the antenna of article A1 since its antenna is placed entirely on the substrate and does not include mobile portions. In particular, the antenna can be made by bonding a wire to the substrate, by photolithography and etching or by printing, for example using an ink jet printer. In addition, in the radio-frequency identification tag claimed, the same strip of electrically conductive transducer material fills the roles of both ground plane and actuator. This simplifies the manufacture of the antenna claimed as only one part instead of two is used to perform the same functions. In addition, the problem of securing a plate of electrically conductive material to a shape-memory polymer is eliminated.

The antenna claimed is thus able to detect the crossing of a temperature threshold or magnetic field while remaining simple to manufacture.

The embodiments of this radio-frequency identification tag can comprise one or more of the features of the dependent claims.

These embodiments of the radio-frequency identification tag also present the following advantages:

The use of a strip, a fixed portion of which is anchored to the substrate, further simplifies the manufacture of the radio-frequency identification tag.

The absence of an electronic chip in the radio-frequency identification tag makes it possible to simplify its manufacture even further.

The use of a shape-memory material as a transducer material makes it possible to detect a crossing of a threshold temperature.

Using a transducer material whose deformation is irreversible also makes it possible to memorise the crossing of the predetermined threshold even when a reader is not present.

The fact that the amplitude of the maximum displacement of the antenna between its far and near positions is at least greater than 1 mm, makes the identification of these two positions easier.

The invention also relates to an assembly comprising:
the radio-frequency identification tag claimed, and
the reader able to emit an electromagnetic wave at an interrogation frequency to read the radio-frequency identification tag.

In the assembly above, the crossing of the predetermined threshold is encoded by the frequency of the electromagnetic wave used to communicate with the reader. This means of encoding the information, according to which the predetermined threshold was crossed or not, is independent of the distance between the reader and the radio-frequency identification tag.

The invention will become more apparent in light of the following description, given only by way of non-limiting example and with reference to the accompanying drawings in which: FIG. 1 is a schematic illustration of an assembly used to detect the crossing of a temperature threshold;

In these figures, the same references are used to designate the same elements. In the following description, features and functions well-known to those skilled in the art are not described in detail.

Figure 1:
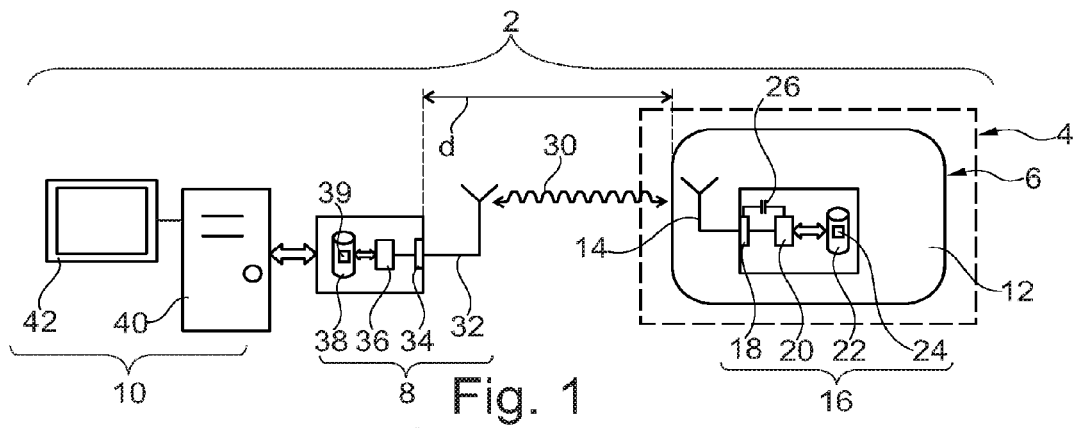

FIG. 1 represents an assembly 2 for detecting the crossing of a predetermined threshold $S_T$ by a physical quantity selected from the group consisting of a temperature and a magnetic field. In the particular case described herein, the assembly 2 is used to detect a temperature variation of an object 4. The object 4 is for example packaging, a package, a living organism or any other object on which a radio-frequency identification tag can be attached or secured.

For this purpose, the assembly 2 comprises:
a radio-frequency identification tag 6 integral with the object 4,
a reader 8 of the radio-frequency identification tag 6, and
a device 10 for processing the information read by the reader 8.

The radio-frequency identification tag 6 is secured to the object 4, for example, without any degree of freedom. Typically, it is glued to the object 4. It can also be built into the object 4 during its manufacture. It is also possible to secure the radio-frequency identification tag to the object 4 by means of a strap or tie. It is also possible that the radio-frequency identification tag is secured to the object 4 with a degree of freedom enabling it to move. For example, only one end or one edge of the radio-frequency identification tag is secured to the object 4.

The radio-frequency identification tag 6 comprises:
a substrate 12 having an upper face facing upwards,
an antenna 14 placed entirely on and secured to this upper surface of the substrate 12 without any degree of freedom, and
an electronic chip 16 placed on and secured directly to the substrate 12 without any degree of freedom.

In this embodiment, the upper face is flat and horizontal. The substrate 12 is made from an electrically insulating material. Here, the term "electrically insulating material" refers to a material whose resistivity at 20° C. is greater than $10^6$ Ω·m and, preferably greater than $10^{10}$ Ω·m. In addition, the substrate 12 is made from a material that is permeable to the electromagnetic waves emitted by the antenna 14. For example, the substrate 12 is a polymer such as polyethylene naphthalene (PEN), polyethylene terephthalate (PET) or Plexiglas having a thickness between 200 μm and 2 mm. The substrate 12 can also be made from other non-magnetic material such as paper or cardboard.

In FIG. 1, the antenna 14 is represented schematically. Possible exemplary embodiments are described in more detail with reference to the following figures. The antenna 14 can receive and transmit an electromagnetic wave. In this case, it is designed to reflect, generally only a part, of an electromagnetic wave emitted by the reader 8. Typically, the antenna 14 is comprised of an electric track made of an electrically conductive material deposited directly on the upper face of the substrate 12. Here, the term "electrically conductive material" refers to a material whose resistivity at 20° C. is less than 1 Ω·m and, preferably less than $10^{-3}$ or $10^{-5}$ Ω·m. The entire antenna 14 is secured to the upper face of the substrate 12 without any degree of freedom.

Many processes are possible to produce the antenna 14 on the upper face of the substrate 12. For example, the antenna 14 is obtained by gluing a conductive wire or by depositing a layer of electrically conductive material on said upper face, and then by etching this layer. The antenna 14 can also be achieved by localised spraying of a conductive ink directly onto the upper surface of the substrate 12.

The electronic chip 16 comprises:
a transceiver 18 electrically connected to the antenna 14, an electronic computer 20, like a microprecessor, adapted to execute instructions stored in a memory to process and transmit information, and a non-volatile memory 22 comprising, for example, the instructions executed by the computer 20 and data such as a unique identifier 24.

The identifier 24 allows this radio-frequency identification tag 6 to be uniquely identified among all other radio-frequency identification tags likely to be read by the reader 8.

The transceiver 18 converts at least part of the electromagnetic wave captured by antenna 14 into electrical energy stored in a capacitor 26, for example. The capacitor 26 is built into the chip 16. The electrical energy stored in this capacitor 26 is then used, when it exceeds a predetermined threshold, to power the computer 20. The transceiver 18 also demodulates the electromagnetic wave received to transform the data encoded in this electromagnetic wave into digital data transmitted to the computer 20. The modulation of data transmitted to the radio-frequency identification tag 6 is, for example, an amplitude modulation or a phase modulation. Finally, the transceiver 18 is also able to transmit to the reader 8 data that is transmitted to it in digital format by the computer 20. To do this, for example, the transceiver 18 modifies the input impedance of the chip 16 according to the information bits to be transmitted. The modification of the input impedance of the chip 16 is reflected by a modification in the reflection coefficient of the antenna 14. The value of the input impedance of the chip 16 is, for example, modified by changing the value of a resistive load connected between terminals of the antenna 14. Thus, according to the value of the bit or group of bits to be transmitted, the amplitude of the electromagnetic wave reflected by the antenna 14 is changed. This modification of the ratio between the amplitude of the electromagnetic wave transmitted by the reader 8 and the amplitude of the electromagnetic wave reflected by the antenna 14 is detected by the reader 8. Based on this difference in amplitudes, the reader extracts the value of the bit or group of bits transmitted by the radio-frequency identification tag. Typically, the part of the electromagnetic wave that is not reflected by the antenna 14 is used by the transceiver 18 to charge the capacitor 26. The communication protocol between the radio-frequency identification tag 6 and the reader 8 is known as "rétro-modulation" in French or "backscattering" in English. It allows the reader 8 to:

communicate with the radio-frequency identification tag 6 via a wireless connection 30, and simultaneously, supply the radio-frequency identification tag 6.

With this protocol, the connection 30 can be established with a radio-frequency identification tag located at a distance d from the reader. Typically, this distance d is greater than 2 cm, 10 cm, 1 m or 10 m. Generally, this distance is also less than 50 m or 30 m.

The frequency $f_r$ of the electromagnetic wave used to establish the connection 30 is often selected from the group comprised of the following frequencies:

the range of frequencies between 860 MHz and 960 MHz for UHF (Ultra High Frequency) radio-frequency identification tags, the frequency 13.56 MHz, and the frequency 125 kHz.

For example, the radio-frequency identification tag 6 operates in the frequency range between 860 MHz and 960 MHz.

The radio-frequency identification tag 6 is a passive radio-frequency identification tag, i.e. there is no source of onboard electrical energy in the radio-frequency identification tag. In other words, the radio-frequency identification tag 6 is powered only by the energy captured by the antenna 14.

The reader 8 is able to establish the connection 30 with the radio-frequency identification tag 6 and thus read this radio-frequency identification tag 6. For this purpose, the reader comprises:

an antenna 32, a radio transceiver 34 electrically connected to the antenna 32, a programmable electronic computer 36 adapted to execute instructions stored in a memory, and a memory 38.

The memory 38 contains the instructions required for the reader 8 to read the radio-frequency identification tag 6 and, in particular, for it to be able to detect that the temperature of the radio-frequency identification tag 6 has exceeded the threshold $S_T$.

The reader 8 is, for example, identical to that described in article A1. Thus, only the details necessary to understand the invention are provided here. The reader 8 is able to automatically adjust the frequency $f_r$ of the electromagnetic wave used to establish the connection 30. Specifically, the reader 8 can automatically select the frequency $f_r$ for which the rate of transfer τ of energy between the reader 8 and the radio-frequency identification tag 6 is greater than a predetermined limit α. For example, the limit α is greater than or equal to 0.8 or 0.9. This rate τ is defined in section III of article A1. Its definition is thus not repeated here. It will simply be reminded that this rate τ is between 0 and 1 and that, for an electromagnetic wave received by the radio-frequency identification tag, the closer it is to 1, the greater the amount of electrical energy that the the radio-frequency identification tag can recover from the electromagnetic wave. This rate τ depends on the input impedance of the chip 16 and the impedance of the antenna 14. For example, this rate τ is defined by the following relationship: $\tau = 4R_a R_c / |Z_a + Z_c|^2$, wherein:

$R_a$ and $R_c$ are the resistances of the antenna 14 and the input impedance of the chip 16, respectively, $Z_a$ and $Z_c$ are the impedances of the antenna 14 and the input impedance of the chip 16, respectively.

When the rate τ is greater than the limit α, the reader 8 can read a radio-frequency identification tag further from the reader or, for a given distance, read this radio-frequency identification tag with a weaker electromagnetic wave.

Here, as in the article A1, in order to inform the reader 8 that the temperature of the radio-frequency identification tag has exceeded the threshold $S_T$, the impedance of the antenna 14 is modified. This results in a modification of the frequency range where the rate τ is greater than the limit α. Here, the frequency range for which the rate τ is greater than the limit α when the temperature of the radio-frequency identification tag 6 is below the threshold $S_T$, is denoted by $[f_{CL}; f_{CH}]$. Here, the frequency range for which the rate τ is greater than the limit α, when the temperature of the radio-frequency identification tag is greater than the threshold $S_T$, is denoted $[f_{HL}; f_{HH}]$. Preferably, when the temperature of the radio-frequency identification tag 6 is less than the threshold $S_T$, outside the range $[f_{CL}; f_{CH}]$, the rate τ decreases very quickly to zero or near zero. Similarly, when the temperature of the radio-frequency identification tag is greater than threshold $S_T$, outside the range $[f_{HL}; f_{HH}]$, the rate τ decreases very quickly to be near zero outside this range. Here, as described in more detail below, the modification of the impedance of the antenna 14 caused by the crossing of the threshold $S_T$ is large enough that there is no common frequency between ranges $[f_{CL}; f_{CH}]$ and $[f_{HL}; f_{HH}]$. Thus, if the frequency automatically chosen by the reader 8 to read the radio-frequency identification tag 6 is within the range $[f_{CL}; f_{CH}]$, then the reader 8 automatically deduces that the temperature of the radio-frequency identification tag has remained below the threshold $S_T$. On the contrary, if the frequency automatically chosen by the reader 8 to read the radio-frequency identification tag 6 is within the range $[f_{HL}; f_{HH}]$, then the reader 8 deduces that the temperature of the radio-frequency identification tag 6 has exceeded the threshold $S_T$.

To do this, the reader 8 has a table 39, in its memory that associates the range $[f_{CL}; f_{CH}]$ with an indication $t_C$ encoding the fact that the temperature of the radio-frequency identification tag 6 is below the threshold $S_T$. This table 39 also associates the range $[f_{HL}; f_{HH}]$ with an indication $t_H$ that encodes the fact that the temperature of the radio-frequency identification tag 6 has exceeded the threshold $S_T$.

Note that in this embodiment, although the radio-frequency identification tag 6 comprises a single chip 16 and a single antenna 14, the reader 8 is able to read this chip in the case where its temperature is lower and in the case where its temperature is greater than the threshold $S_T$. Thus, regardless of the temperature of the radio-frequency identification tag 6, the reader 8 can read its identifier 24.

The reader 8 is connected to the device 10 in order to send it the data read in the radio-frequency identification tag 6. For example, the reader 8 transmits, to the device 10, the identifier 24 read in the radio-frequency identification tag 6 and the indication $t_c$ or $t_H$ deduced from the frequency $f_r$ used to read the radio-frequency identification tag 6.

For example, the device 10 is equipped with a CPU 40 and a screen 42 in order to display on this screen the data read in the radio-frequency identification tag 6 in a manner that is directly readable and understandable by a human being.

The radio-frequency identification tag 6 comprises a strip 66 (FIGS. 3 and 4) which modifies the inductance of the antenna 14 in response to the crossing of the threshold $S_T$ by the temperature of the radio-frequency identification tag. To do this, in this embodiment, this strip 66 deforms in flexion between a far position represented in FIG. 3, and a near position represented in FIG. 4. In this embodiment, the deformation of the strip between its far and near positions is reversible. Thus, if the temperature of the radio-frequency identification tag 6 drops below the threshold $S_T$, the strip returns to its far position.

Figures 2, 3:
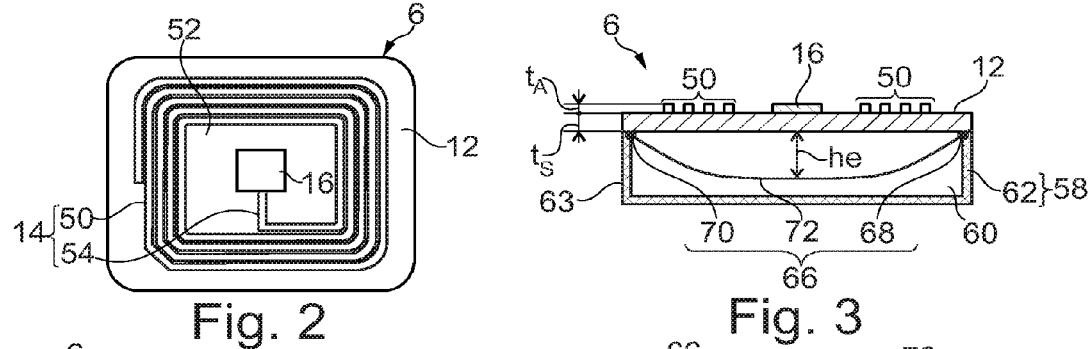
FIG. 2 is an illustration, seen from above, of a first embodiment of a radio-frequency identification tag of the assembly of FIG. 1.
FIGS. 3 and 4 are illustrations in vertical cross-section of the radio-frequency identification tag of FIG. 2 in two different positions.

FIG. 2 represents the antenna 14 in greater detail. The antenna 14 presents a self-inductance typically greater than 0.5 µH and, preferably, greater than 1 µH regardless of the position of the strip. For this purpose, here, the antenna 14 is spiral-shaped. More specifically, it comprises an electrical track 50 which wraps around a central vertical axis while moving progressively away from said central axis. The track 50 makes several complete revolutions around this central axis to form a plurality of turns. The number of turns is set so that the self-inductance of the antenna 14 is greater than the previously cited threshold.

Conventionally, the track 50 is wound around a central space 52. This central space 52 has, for example, a surface area in a horizontal plane, exceeding 1 cm² or 2 cm² and generally less than 25 cm² or 10 cm². The chip 16 is secured to the substrate 12 inside this central space 52. Furthermore, the horizontal rectangle of smaller surface area that completely contains the track 50 has, for example, an area less than 30 cm² or 25 cm² and, preferably, an area less than 5 cm² or 3 cm². The number of turns of the antenna 14 is often greater than 2, 4 or 5.

The antenna 14 also comprises a rectilinear strand 54 connected directly to the transceiver 18 on one side and to the inner end of the track 50 on the other side.

Here, this strand 54 is a rectilinear extension of the track 50.

The width of the track 50, in a horizontal direction, is generally between 100 µm and 2 mm. The thickness $t_A$ of the track 50 in a vertical direction, is generally between 1 µm and 500 µm. In FIG. 3, the thickness $t_s$ of the substrate 12 is also noted. Here, the thickness $t_s$ is constant and is, for example, between 100 µm and 5 mm. The track 50 and the strand 54 are, for example, made of copper.

FIG. 3 represents the elements located below the antenna 14. The radio-frequency identification tag 6 comprises a parallelepiped housing 58 defining an internal cavity 60. More specifically, the housing 58 comprises right 62 and left 63 vertical walls terminating in upper edges defining an opening that opens into the cavity 60. Here, these upper edges are secured, without any degree of freedom, directly to an underside of the substrate 12 so that the substrate 12 completely closes the opening. Here, the entire track 50 of the antenna 14 is placed above the cavity 60.

Typically, the housing 58 is a rigid housing, i.e. at least as rigid as the substrate 12 and, preferably, more rigid than the substrate 12.

The strip 66 is completely housed inside the cavity 60. The strip 66 is made of an electrically conductive material. In this embodiment, the strip 66 comprises two fixed portions 68 and 70 directly anchored to the vertical walls 62 and 63, respectively, without any degree of freedom. The strip 66 also comprises a mobile portion 72 that extends between its two fixed portions 68 and 70. The fixed portions 68 and 70 correspond to right and left transversal edges of the strip 66. Here, the strip 66 is curved downwards, i.e. towards the bottom of the housing 58. Thus, the mobile portion 72 is underneath, in the vertical direction, the fixed portions 68 and 70. In the far position, the mobile portion 72 is far by a maximum distance $h_e$ from the underside of the substrate 12. In the near position (FIG. 4), the mobile portion 72 is far by a maximum distance $h_r$ from the underside of the substrate 12. The distance $h_r$ is typically 1.5 times or 2 times smaller than the distance $h_e$. For example, the distance $h_e$ is greater than or equal to 5 mm or 1 cm and the distance $h_r$ is less than or equal to 2 mm or 3 mm. The maximum deflection $A_{max}$ between the far and near positions of the strip 66 is equal to the difference between the distances $h_e$ and $h_r$. This maximum deflection is at least greater than 1 mm and, preferably, greater than or equal to 3 mm or 5 mm or 7 mm.

The displacement of the strip 66 between its far and near positions results in a modification in the distance that separates the antenna 14 from the mobile portion 72. Given that the strip 66 is made of an electrically conductive material, it significantly modifies the inductance of the antenna 14. Here, it is considered that a modification of the self-inductance of the antenna 14 is significant when the inductance varies by more than 10% and, preferably, by more than 20% or 30% in relation to the inductance value of the antenna 14 in the far position of the strip 66. It is this modification of the inductance of the antenna 14 that results in the existence of two separate ranges $[f_{CL}; f_{CH}]$ and $[f_{HL}; f_{HH}]$.

In this embodiment, the movement of the strip 66 between its far and near positions is achieved by making the strip 66 from a material that is both electrically conductive and transducer which transforms the temperature variation of the radio-frequency identification tag 6 when it crosses the threshold $S_T$ in a sudden mechanical deformation of the strip 66. For this purpose, here, the strip 66 is formed solely from a single block of transducer material. When the temperature of the radio-frequency identification tag 6 exceeds the threshold $S_T$, the strip 66 suddenly shrinks, causing it to abruptly change from the far position to the near position. To do this, the transducer material used to make the strip 66 is a shape-memory material. The shape-memory material used here designates a material whose elongation ratio is greater than 1% or 2% in response to a temperature variation typically of at least 2° C. and, for example, of 5° C. or 10° C. or 20° C. The elongation ratio is the ratio ΔL/L between the amplitude ΔL of the deformation measured along the axis where this deformation is maximal over the length L of this material measured along the same axis. This significant variation in the length of the shape-memory material is obtained only when its transition temperature is crossed. Here, the shape-memory material is chosen so that its transition temperature is equal to the threshold $S_T$ to within plus or minus 5° C., or within plus or minus 1° C. It will also be noted that, typically, a shape-memory material suddenly shrinks when its temperature exceeds the transition temperature. In other words, its behaviour is opposite that obtained by simple thermal expansion.

In this embodiment, the shape-memory material is typically a shape-memory alloy. Thus, the strip 66 fulfils the actuator function and the ground plane function for the electromagnetic waves emitted by the antenna 14.

For example, the shape-memory material used is Nitinol which is a nickel and titanium alloy and whose Young's modulus at 25° C. is typically greater than 150 GPa.

Figures 4, 5:
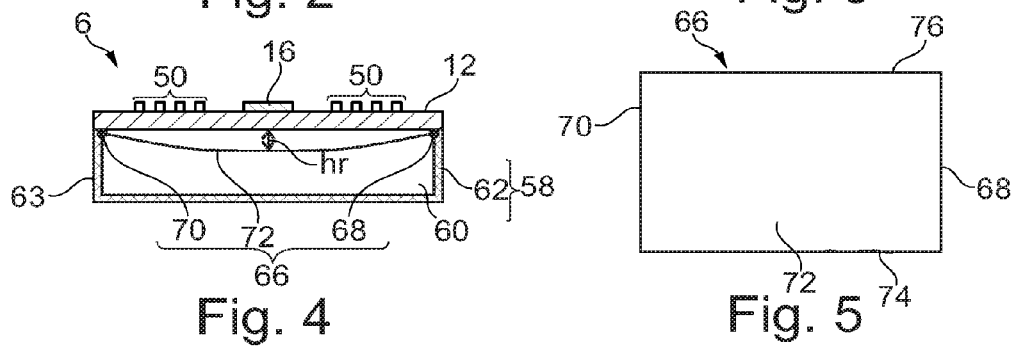
FIG. 5 is an illustration, seen from above, of a strip of the radio-frequency identification tag of FIG. 2.

FIG. 5 represents the strip 66 in greater detail. In this embodiment, the strip 66 is rectangular and the direction in which its deformation is maximum is parallel to the longer side of the strip 66, i.e. parallel to the longitudinal edges 74 and 76. The edges 74 and 76 are not directly secured to the vertical walls of the housing 58 in order to allow the strip 66 to move easily in flexion between its far and near positions. The transverse edges, i.e. the smaller sides of the strip 66, correspond to the fixed portions 68 and 70.

The dimensions of the strip 66 are such that its orthogonal projection onto the underside of the substrate contains at least 50% and, preferably, at least 70% or 90% and, in an even more advantageous manner 100% of the orthogonal projection of antenna 14 onto the same side. Thus, the minimum dimensions of the strip 66 are deduced from the dimensions of the antenna 14. On the contrary, it is generally not necessary that the dimensions of the strip 66 are much larger than those of the antenna 14.

The operation of the radio-frequency identification tag 6 is deduced from the foregoing explanations.

Figures 6, 7:
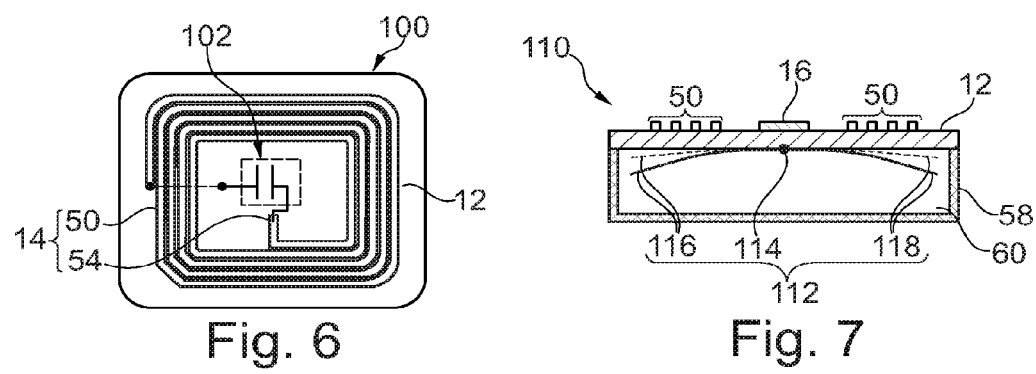
FIG. 6 is a schematic illustration, seen from above, of a second embodiment of a radio-frequency identification tag for the assembly of FIG. 1.
FIGS. 7 to 11 are schematic illustrations in vertical cross-section of third, fourth, fifth, sixth and seventh embodiments, respectively, of a radio-frequency identification tag of FIG. 1.

FIG. 6 represents a radio-frequency identification tag 100 that might be used instead of the radio-frequency identification tag 6 in the assembly 2. It is identical to the radio-frequency identification tag 6 except that the chip 16 is replaced by a simple electrical load 102 electrically connected between the two ends of the antenna 14. In FIG. 6, the dashed track that electrically connects a terminal of the load 102 to the outer end of the antenna 14 indicates that the track is, for example, made on the underside of the substrate 12 opposite its topside. In this embodiment, the load 102 is a capacitor that forms a resonant LC circuit with the antenna 14. The LC circuit thus formed resonates at a resonance frequency $f_{R1}$ when the strip 66 is in its far position and has a frequency $f_{R2}$ in the near position. The capacitance of the capacitor 102 and the self-inductance value of the antenna 14 are adjusted so that the frequencies $f_{R1}$ and $f_{R2}$ coincide with frequencies that the reader 8 is able to emit. In these conditions, when the strip 66 is in its far position, the rate τ is maximum for an electromagnetic wave emitted at frequency $f_{R1}$. However, when the strip 66 is in its near position, the rate T is maximum for an electromagnetic wave emitted at frequency $f_{R2}$.

The reader 8 is therefore able to ascertain whether or not the threshold $S_T$ is exceeded in the same way as the radio-frequency identification tag 6. However, in this simplified embodiment, no microchip is used. Consequently, the identifier 24 of the radio-frequency identification tag is not transmitted to the reader 8.

FIG. 7 represents a radio-frequency identification tag 110 that might be used instead of the radio-frequency identification tag 6 in the assembly 2. The radio-frequency identification tag 110 is identical to the radio-frequency identification tag 6 except that the strip 66 is replaced by a strip 112. The strip 112 comprises a central fixed portion 114 secured to the centre of the underside of the substrate 12 without any degree of freedom. Here, the fixed portion 114 is located under the chip 16. Two mobile portions 116 and 118 extend on either side of this fixed portion 114. In FIG. 7, the far and near positions of the mobile portions 116 and 118 are represented as solid lines and dashed lines, respectively. As in the previous embodiment, when the temperature of the strip 112 crosses the threshold $S_T$, the mobile portions 116 and 118 move closer to the antenna 14. The rest of the operation of the radio-frequency identification tag 110 is similar to the operation of the radio-frequency identification tag 6.

Figure 8:
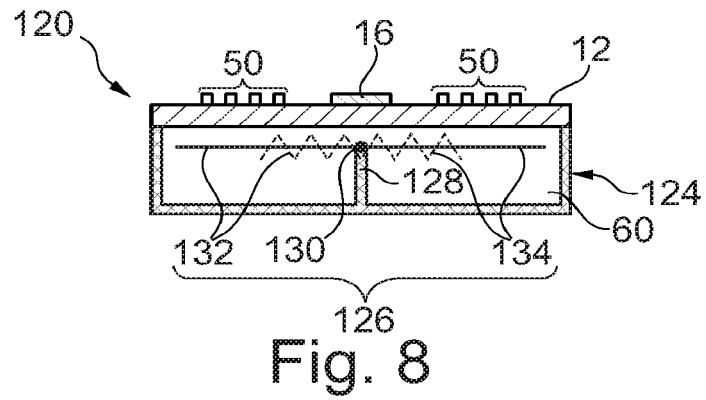

FIG. 8 represents a radio-frequency identification tag 120 that might be used instead of the radio-frequency identification tag 6 in the assembly 2. The radio-frequency identification tag 120 is identical to the radio-frequency identification tag 6 except that the housing 58 and the strip 66 are replaced by a housing 124 and a strip 126, respectively.

The housing 124 is identical to the housing 58 except that it further comprises a central leg 128 that protrudes from the bottom of this housing 58 in the direction of the chip 16.

The strip 126 is identical to the strip 66 except that it comprises:
  a central portion secured to the upper end of the leg 128 without any degree of freedom, and
  two mobile portions 132 and 134 located on either side of the fixed portion 130.

In FIG. 8, the near and far positions of the strip 126 are represented as solid and dashed lines, respectively. In this embodiment, in the near position, the strip 126 extends primarily in a horizontal plane and under the entire track 50 of the antenna 14. In far position, the mobile portions 132, 134 curl up on themselves in a direction parallel to the plane of the substrate 12. For example, the mobile portions 132, 134 curl up on themselves by folding in an accordion-like manner. Therefore, once the mobile portions 132, 134 have curled up, the strip 126 is no longer or practically no longer located below the track 50. In this embodiment, the strip 126 moves from its near position to its far position in response to exceeding the threshold $S_T$ by the temperature of the radio-frequency identification tag 120.

Figure 9:
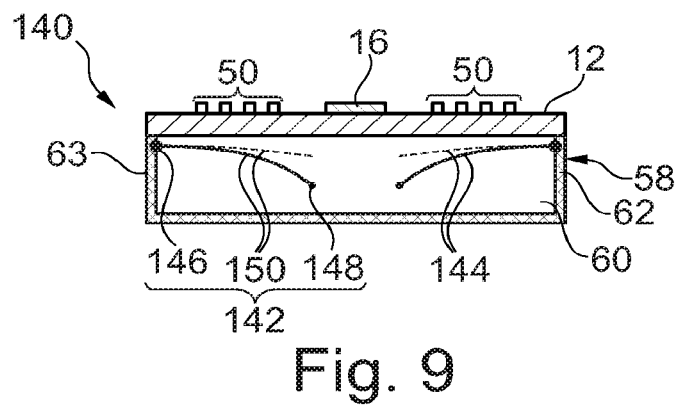

FIG. 9 represents a radio-frequency identification tag 140 that might be used instead of the radio-frequency identification tag 6 in the assembly 2. The radio-frequency identification tag 140 is identical to the radio-frequency identification tag 6 except that the strip 66 is replaced by two strips 142 and 144.

The strip 142 is identical to the strip 66 except that it comprises only one fixed portion 146 embedded in the vertical wall 63 of the housing 58. The end 148 of the strip 142 opposite its fixed portion 146 is left free to move within the cavity 60. The mobile portion 150 of the strip 142 extends from the fixed portion 146 to the free end 148. The end 148 is, for example, located in a vertical position in relation to the central portion 52 of the antenna 14. In FIG. 9, the far and near positions of the strip 142 are represented as solid lines and dashed lines, respectively. In the remote position, the end 148 is furthest from the underside of the substrate 12 than in the near position.

The strip 144 is similar to the strip 142 in symmetry in relation to a vertical plane passing through the centre of the chip 16 and parallel to the wall 63. The operation of the radio-frequency identification tag 140 is similar to the operation of the radio-frequency identification tag 6.

Figure 10:
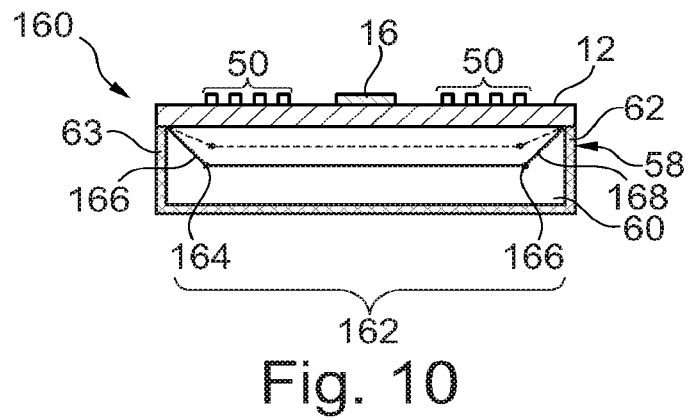

FIG. 10 represents a radio-frequency identification tag 160 that might be used instead of the radio-frequency identification tag 6 in the assembly 2. The radio-frequency identification tag 160 is identical to the radio-frequency identification tag 6 except that the strip 66 is replaced by a strip 162. The strip 162 is identical to the strip 66 except that its transverse edges 164 and 166 are not anchored directly in the vertical walls 62 and 63 without any degree of freedom. Here, the transverse edges 164, 166 are mechanically connected to the vertical walls 63, 62 by strands 166 and 168, respectively. The strand 166 has one end anchored in the wall 63 and an opposite end secured to the transverse edge 164. The strand 166 allows the edge 164 to rotate about the anchor point of this strand in the wall 63. The strand 166 is not made of a transducer material. However, it may or may not be made of an electrically conductive material. The strand 168 is symmetrical with the strand 166 with regard to a vertical plane passing through the centre of the chip 16 and parallel to the wall 63.

In FIG. 10, the far and near positions of the strip 162 are represented as solid lines and dashed lines, respectively. When the temperature of the radio-frequency identification tag 160 exceeds the threshold $S_T$, the strip 162 suddenly shrinks in its longitudinal direction, which causes simultaneous traction on the strands 166 and 168 and thus an upward movement of the strip 162 which moves closer to the underside of the substrate 12.

Figure 11:
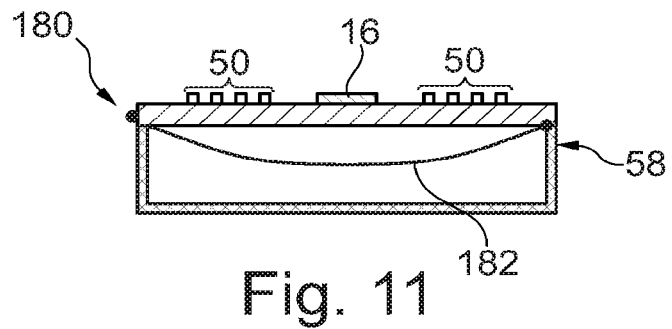

FIG. 11 represents a radio-frequency identification tag 180 identical to the radio-frequency identification tag 6 except that the strip 66 is replaced by a strip 182. The strip 182 is identical to the strip 66 except that it is made of magnetostrictive or magnetic shape-memory material and not a thermal shape-memory material.

Here, magnetostrictive material refers to a material for which the absolute value of the magnetostriction coefficient $\lambda_s$ at saturation is greater than 10 ppm (parts per million) and, preferably, greater than 100 or 1000 ppm. The coefficient $\lambda_s$ is defined by the following relationship $\lambda_s = \Delta L/L$, where $\Delta L$ is the deformation amplitude of the magnetostrictive material along the direction in which its deformation is maximum and L is the length of this material in this direction in the absence of a magnetic field. For example, the magnetostrictive material is Terfenol-D or an FeSiB alloy or an FeCo alloy. In this case, the magnetostriction coefficient $\lambda_s$ of this material is strictly positive. The magnetostrictive material may also have a negative magnetostriction coefficient $\lambda_s$. For example, in this case, the magnetostrictive material is SamFeNol which is a samarium alloy.

A magnetic shape-memory material is a material that works as described for the thermal shape-memory materials except that its deformation is triggered by a variation in the magnetic field and not by a variation in temperature. As for the thermal shape-memory materials, the magnetic shape-memory material has an elongation ratio greater than 1% or 2%. For example, it may be an NiMnGa alloy.

The radio-frequency identification tag 180 functions as the radio-frequency identification tag 6 except that it is a variation of the amplitude of the magnetic field created, for example, by a magnet, a coil or any other external magnetic field source to which the radio-frequency identification tag 180 is exposed, that varies the impedance of the antenna 14.

Numerous other embodiments are possible. For example, the radio-frequency identification tag may comprise a battery or an additional energy recovery system and thus behave like a semi-passive or active radio-frequency identification tag.

Other forms of the antenna 14 are possible. For example, the antenna can also be in a meander shape. In this case, the antenna extends along a longitudinal axis of the topside of the substrate and comprises a plurality of strands arranged one after the other along this longitudinal axis. Each of these strands forming a rectilinear segment, for example, which intersects the longitudinal axis at a single point. These strands are electrically connected to each other by other strands located entirely on one side of this longitudinal axis. An antenna shaped in a meandering fashion is shown in article A1, for example. The antenna can also be shaped in a "T" as described in article A1. One can also use "slot" versions of these antennas; these antennas being characterised by an absence of material ("slot") locally in the metal forming the antenna.

The arrangement of the chip 16 may be different. For example, the transceiver 18 may be built into the computer 20.

In another embodiment, the electrical load 102 is replaced by a resistor. It can also be replaced by a single wire connection. In this case, the reader 8 detects the modification of the mutual inductance between the antenna 32 and the antenna 14 to detect whether or not the temperature threshold $S_T$ had been crossed.

Numerous other embodiments of the strip are possible. For example, several different shape-memory materials can be used to produce various portions of the strip. Each of these shape-memory materials have a transition temperature different from the other shape-memory materials used. For example, a first portion of the strip is made from a first shape-memory material having a transition temperature $T_1$ and another portion of the strip is made from a second shape-memory material having a transition temperature $T_2$ greater than the temperature $T_1$. In these conditions, if the temperature of the strip is below the temperature $T_1$, this corresponds to a first position of the strip and thus to a first impedance value of the antenna. If the temperature of the strip is between the temperatures $T_1$ and $T_2$, the strip deforms to reach a second position and therefore a second impedance value of the antenna. Finally, if the temperature of the strip exceeds the temperature $T_2$, the strip deforms even more, for example, to reach a third position wherein the antenna has a third inductance value. The reader 8 can detect the current inductance value of the antenna and therefore determine the temperature range of the antenna. Thus, different shape-memory materials can be used to detect the crossing of several temperature thresholds.

In another embodiment, it is also possible to use several strips, each strip having a transition temperature different from that of the other strips. The crossing of several different temperature thresholds can thus be detected. For example, the strip 144 is made of a shape-memory material having a transition temperature different from that of the strip 142.

In another variant, the strip 66 is in its near position when the temperature of the radio-frequency identification tag is lower than the threshold $S_T$ and in its far position when the temperature of the radio-frequency identification tag temperature exceeds this threshold $S_T$. To do this, the strip 66 is for example dished on the side opposite that represented in FIG. 3. In these conditions, the shrinkage of the strip 66, when its temperature exceeds the threshold $S_T$, brings the strip into its far position.

The strip may be formed so that the deformation between the far and near positions is irreversible. For this purpose, one may proceed as described in article A1.

The strip 66 does not need to be systematically rectangular. For example, it may be square or elliptical in shape or any other possible shape.

Other modulation methods can be used to transmit data between the reader and the radio-frequency identification tag. For example, the antenna 14 is electrically connected with a variable capacitor to form a resonant LC circuit. The transceiver 18 modifies the value of this capacitor according to the value of the bit or the group of bits to be transmitted. This then modifies the value of the resonance frequency of the LC circuit. The reader detects this modification in the resonance frequency of the LC circuit and deduces the value of the bit or the group of bits transmitted. This communication protocol works especially well when the antennas of the reader and the radio-frequency identification tag are coupled by magnetic induction. This protocol is thus generally used in the near-field, i.e. when the antennas 14 and 32 are separated by a distance less than $\lambda/(2\pi)$; where:

$\lambda$ is the wavelength of the electromagnetic wave used to communicate between these antennas, and $\pi$ is the number Pi.

In another variant, the inductance of the antenna is modified by the transceiver 18. To do this, the transceiver 18 controls an electrical switch that modifies the inductance of the antenna. These two embodiments are described in detail for example on page 21 of the following article by Youbok Lee: "Antenna Circuit Design for RFID applications," Microchip Technology Inc., 2003 Technical note AN710.

The detection of the crossing of the threshold $S_T$ can also be detected by the reader 8 simply due to the fact that it is unable to establish the connection 30 with the radio-frequency identification tag while it is located at a distance where, in the absence of antenna inductance modification, the connection 30 could have been established. For example, to do this, the radio-frequency identification tag is always placed beyond a minimum distance between the reader and the radio-frequency identification tag and less than a maximum distance beyond which the reader cannot normally establish the connection 30 with the radio-frequency identification tag. In these conditions, when the temperature is below the threshold $S_T$, the reader 8 is able to establish the connection 30 with the radio-frequency identification tag 6. Otherwise, i.e. if the temperature has exceeded the threshold $S_T$, the reader cannot establish the connection 30, indicating to it that the temperature of the radio-frequency identification tag 6 has crossed the threshold $S_T$. In this simplified embodiment, it is not necessary that the reader be able to automatically select the frequency for which the transfer rate r is greater than the limit $\alpha$. Typically, in this case, the reading frequency of the radio-frequency identification tag is established once and for all.

All the embodiments and variants previously described herein also apply to the case where the transducer material used is a magnetostrictive material or a magnetic shape-memory material.

The invention claimed is:

1. A radio-frequency identification tag adapted to indicate to a reader, via a wireless connection, that a physical quantity has reached a predetermined threshold, said physical quantity being selected from the group consisting of a temperature of the radio-frequency identification tag and a magnetic field in which the radio-frequency identification tag is immersed, said radio-frequency identification tag comprising:

an electrically insulating substrate, an antenna for establishing the wireless connection with the reader, said antenna being placed entirely on and secured to the insulating substrate without any degree of freedom, a floating ground plane made of an electrically conductive material and electrically insulated from the antenna, said ground plane being mobile relative to the antenna between a first position wherein the impedance of the antenna is equal to a first value and a second position wherein the impedance of the antenna is equal to a second value different from the first value, and an actuator made of a transducer material adapted to convert a variation in the physical quantity into a mechanical displacement of the ground plane between its first and second positions when said Variation leads the physical quantity to cross the predetermined threshold to indicate said predetermined threshold being crossed to the reader, the transducer material being selected from the group consisting of a thermal shape-memory material, a magnetostrictive material and a magnetic shape-memory material, wherein:

the transducer material is also an electrically conductive material, and the ground plane and the actuator are both formed by a single strip made of said transducer material and a mobile portion of which moves relative to the antenna between the first and second positions when the physical quantity crosses the predetermined threshold.

2. The radio-frequency identification tag according to claim 1, wherein the strip comprises a fixed portion anchored to the substrate without any degree of freedom.

3. The radio-frequency identification tag according to claim 1, wherein:

two ends of the antenna are electrically connected to each other either directly via an electrical track or via an electrical load to form a closed electric circuit, and the radio-frequency identification tag has no electronic chip electrically connected to said closed electric circuit.

4. The radio-frequency identification tag according to claim 3, wherein both ends of the antenna are electrically connected to one another via a capacitor to form a resonant LC circuit whose resonance frequency is a function of the inductance of the antenna.

5. The radio-frequency identification tag according to claim 1, wherein the transducer material is a thermal shape-memory material whose elongation ratio is greater than 1% in response to a temperature variation of 10° C. around the predetermined threshold.

6. The radio-frequency identification tag according to claim 1, wherein the strip is arranged so that the displacement of its mobile portion between the first and second positions is irreversible.

7. The radio-frequency identification tag according to claim 1, wherein the amplitude of the maximum deflection of the mobile portion of the strip between its first and second positions is greater than 1 mm.

8. The radio-frequency identification tag according to claim 1, wherein the radio-frequency identification tag is a passive radio-frequency identification tag powered only from the energy of the electromagnetic waves emitted by the reader.

9. An assembly comprising:
a radio-frequency identification tag adapted to indicate to a reader, via a wireless connection, that a physical quantity has reached a predetermined threshold, said physical quantity being selected from the group consisting of a temperature of the radio-frequency identification tag and a magnetic field in which the radio-frequency identification tag is immersed, said radio-frequency identification tag comprising:
an electrically insulating substrate,
an antenna for establishing the wireless connection with the reader, said antenna being placed entirely on and secured to the insulating substrate without any degree of freedom,
a floating ground plane made of an electrically conductive material and electrically insulated from the antenna, said ground plane being mobile relative to the antenna between a first position wherein the impedance of the antenna is equal to a first value and a second position wherein the impedance of the antenna is equal to a second value different from the first value, and
an actuator made of a transducer material adapted to transform a variation in the physical quantity into a mechanical displacement of the ground plane between its first and second positions when said variation leads the physical quantity to cross the predetermined threshold so that the frequency range for which the electrical energy transfer ratio between the reader and the radio-frequency identification tag is greater than a predetermined limit, varies at the same time from a first range to a second rage in response to the crossing of said predetermined threshold by the physical quantity, said first and second frequency ranges having no common frequency, the transducer material being selected from the group consisting of a thermal shape-memory material, a magnetostrictive material and a magnetic shape-memory material, and
the reader adapted to emit an electromagnetic wave at a polling frequency to read the radio-frequency identification tag, said reader being adapted to automatically select the polling frequency to he used so that the electrical energy transfer rate between the reader and the radio-frequency identification tag is greater than the predetermined limit, said reader further comprising a pre-recorded table that combines the first and second frequency ranges, respectively, to indications of non-crossing and crossing of the predetermined threshold, and the reader is adapted to transmit to an external device the indication that is associated, by the pre-recorded table, with the polling frequency automatically selected and used to query the radio-frequency identification tag,
wherein the radio-frequency identification tag is in compliance with claim 1.

* * * * *

UNITED STATES PATENT AND TRADEMARK OFFICE
CERTIFICATE OF CORRECTION

PATENT NO.         : 9,805,299 B2  
APPLICATION NO.    : 15/183082  
DATED              : October 31, 2017  
INVENTOR(S)        : Bernard Viala et al.

Page 1 of 1

It is certified that error appears in the above-identified patent and that said Letters Patent is hereby corrected as shown below:

In the Claims

Column 16, Line 8, change "rage" to --range--;
       Line 19, change "he" to --be--.

Signed and Sealed this  
Seventh Day of August, 2018

Andrei Iancu  
*Director of the United States Patent and Trademark Office*